No. 696,543. Patented Apr. 1, 1902.
W. L. BOGLE.
CORN PLANTER.
(Application filed Nov. 7, 1901.)
(No Model.) 3 Sheets—Sheet 1.
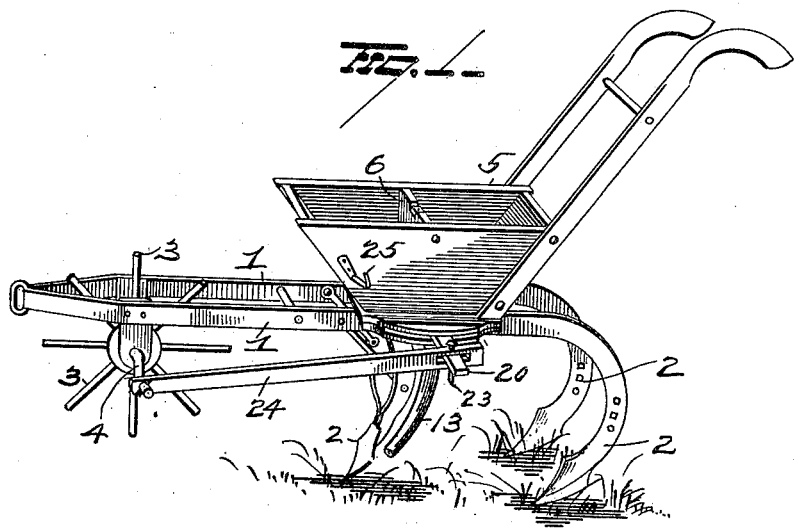
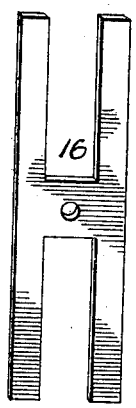
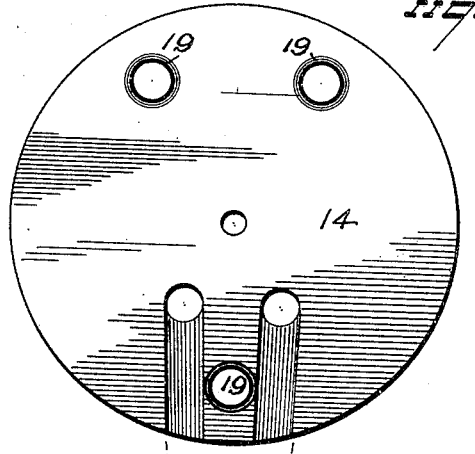
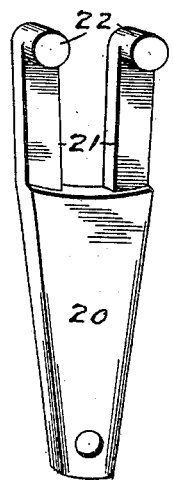
WITNESSES
INVENTOR
W. L. Bogle
By H. A. Seymour
Attorney
THE NORRIS PETERS CO., PHOTO-LITHO., WASHINGTON, D. C.

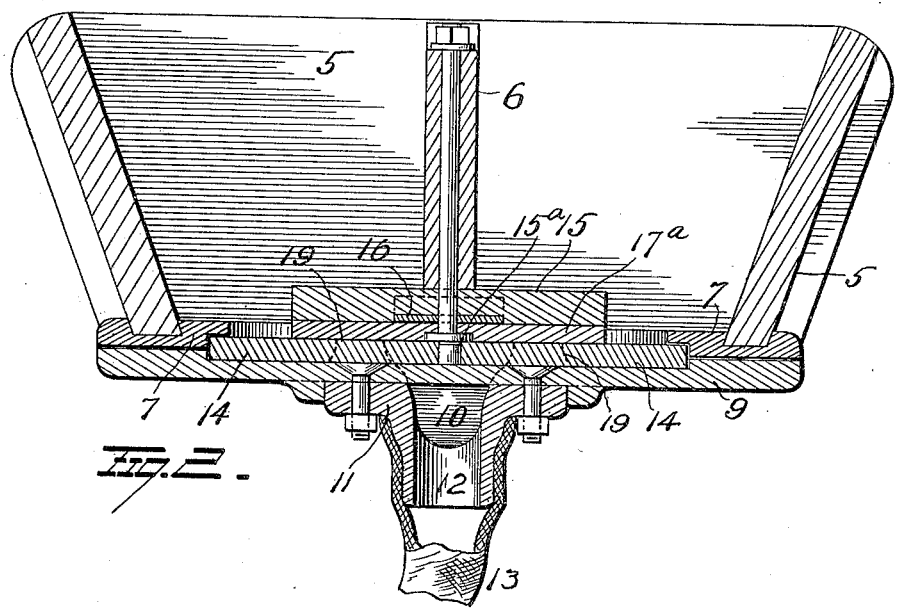
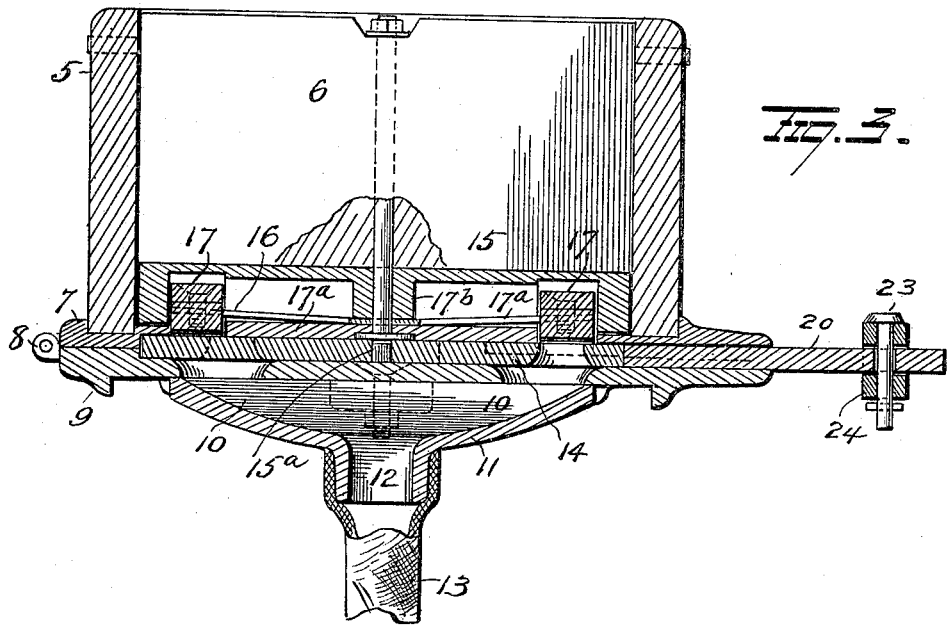

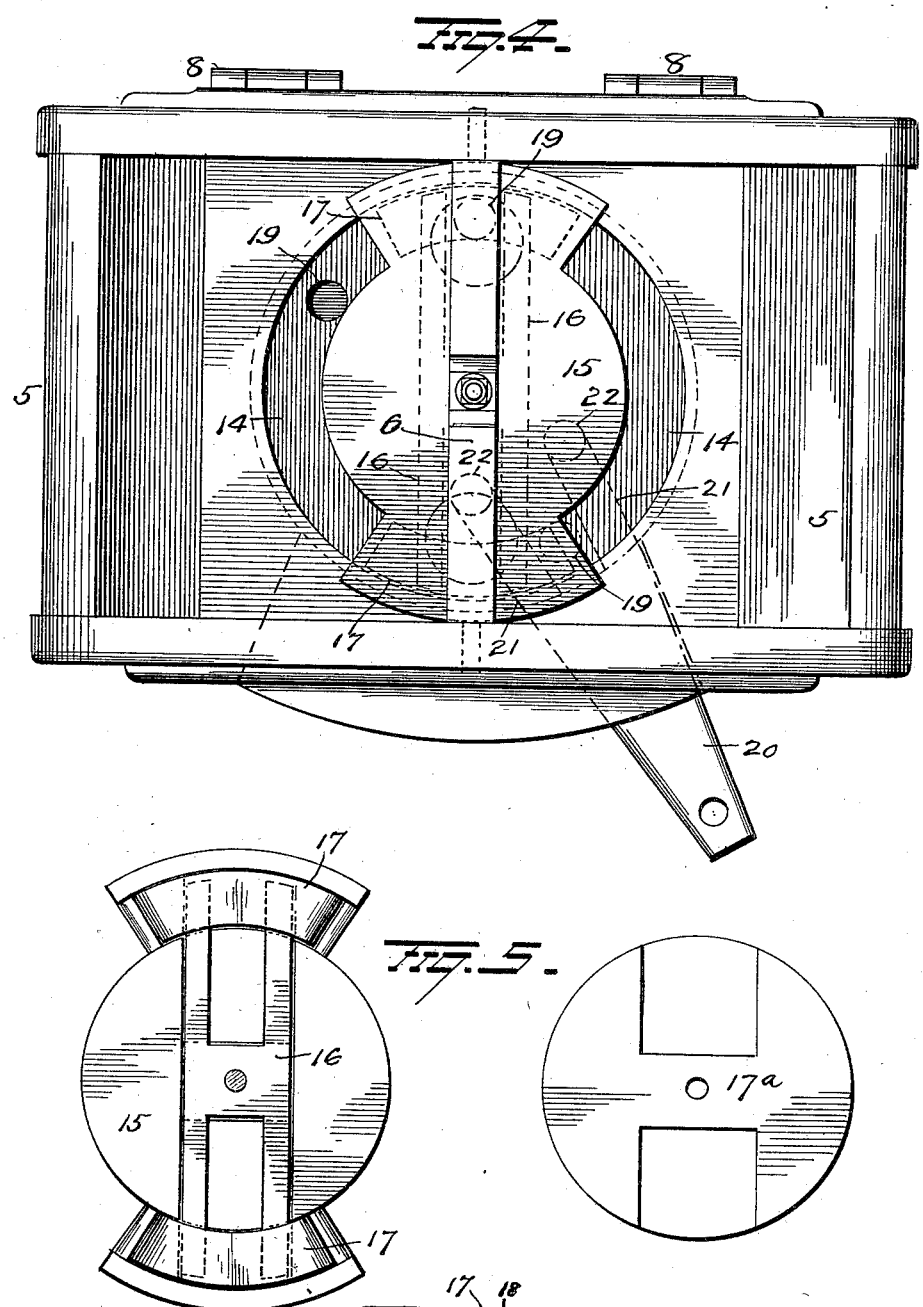

UNITED STATES PATENT OFFICE.

WILLIAM LUTHER BOGLE, OF COLUMBUS, MISSISSIPPI.

CORN-PLANTER.

SPECIFICATION forming part of Letters Patent No. 696,543, dated April 1, 1902.

Application filed November 7, 1901. Serial No. 81,403. (No model.)

*To all whom it may concern:*

Be it known that I, WILLIAM LUTHER BOGLE, a resident of Columbus, in the county of Lowndes and State of Mississippi, have invented certain new and useful Improvements in Corn-Planters; and I do hereby declare the following to be a full, clear, and exact description of the invention, such as will enable others skilled in the art to which it appertains to make and use the same.

My invention relates to an improvement in corn-planters, and more particularly to a planter attachment for cultivators, the object of the invention being to provide a device of this character which can be operated to plant corn and other seed at the same time, but in different hills, or which can be operated to plant different seeds in the same hills.

A further object is to provide an improved planter with an improved seed-dropping plate and improved mechanism for oscillating the same.

A further object is to provide an improved planter whose operation will be uniform, which will not crush the seed, which will be comparatively cheap to manufacture and repair in the event of injury thereto, and whose simplicity of construction and perfect operation will be a vast improvement on all devices of this character heretofore known.

With these objects in view the invention consists in certain novel features of construction and combinations and arrangements of parts, as will be more fully hereinafter described, and pointed out in the claims.

In the accompanying drawings, Figure 1 is a view in side elevation, illustrating my improvements. Figs. 2 and 3 are views in section, taken at right angles to each other. Fig. 4 is a plan view with the body of the seedbox thrown back, and Figs. 5, 6, and 7 are views of various details of construction.

1 represents the beams of an ordinary cultivator, to the rear of which are secured the teeth 2 and supported at their forward ends by a wheel 3, secured on a crank-shaft 4, mounted in suitable bearings secured to the beams. This wheel 3 is preferably rimless, as shown; but other forms of wheel may be employed to effectually operate the planter.

5 represents the body of the seed-receptacle, which comprises the base or bottom 7, parallel sides, and inclined ends and made with a central partition 6, dividing the seed-receptacle into two compartments. The bottom 7 is connected at one side by a hinge or hinges 8 to a plate 9, secured on the beams 1. This plate 9 is provided at opposite sides of the partition with openings which communicate with ducts or passages 10 in a block or coupling 11, secured to the bottom of plate 9 and made with a common discharge-spout 12 for said ducts or passages, and on which spout 12 a flexible pipe 13 is secured and adapted to direct the seed behind one of the teeth 2. The upper face of this plate 9 is made with a circular depression to receive the circular seed-plate 14, which latter is made with a central hole to receive a pivot-pin $15^a$, projecting up from the center of plate 9 and adapted to serve as a journal on which the plate 14 is oscillated, as will more fully hereinafter appear.

The bottom 7 of the seed-receptacle is made with a central circular opening and an annular recess all around said opening on the lower face of the bottom to receive the seed-plate 14 and seat the same therein, and to the lower edge of the partition a circular block 15 is secured and is of appreciably less diameter than the opening in the bottom of the seed-receptacle, so as to provide a space on each side of the partition, through which the seed falls onto plate 14. The block 15 is recessed on its lower face to receive a flat H-shaped spring 16, the intermediate or connecting part thereof secured to an enlargement $17^b$ in the center of the recess, and a disk $17^a$ is secured on the bottom of block 15, inclosing the greater portion of said spring 16. The free ends of the spring 16 project into the space between the block 15 and the bottom of the seed-receptacle and have secured thereto cut-offs 17. These cut-offs 17 each comprise a bar curved to conform to the curvature of the space between the block 15 and bottom of the seed-receptacle and of just the proper width to fill such space, and each cut-off 17 is provided in its upper face with a recess to receive the free ends of spring 16, the latter being secured in such recess by a block 18, secured to the bar by means of a screw or in any other approved manner. Suitable housings 17ᶜ are provided on each side of block 15 to receive and guide the cut-offs 17. The spring 16 serves to hold these cut-offs 17 yieldingly upon the seed-plate 14, preventing only the proper amount of seed to escape, as will now be explained.

The seed-plate 14, above referred to, is provided with two or more holes 19, arranged so as to expose said holes to the seed falling between the block 15 and bottom of the seed-receptacle and adapted when the plate is oscillated to be moved beneath the cut-offs 17 and communicate with the ducts or passages 10 in coupling 11, and hence drop the seed onto the ground, the cut-offs serving to prevent the escape of any seed except such as has fallen into the holes 19, which latter being closed by the plate 9 serve as cups to convey the seed to the passages 10.

To oscillate the seed-plate 14, I provide a lever 20, preferably of the shape shown, having two arms 21, disposed in grooves in the plate 14 and provided with circular enlargements 22 at their free ends located in similarly-shaped holes or pockets in the plate, thereby securely holding the lever 20 keyed to the plate, but permit its easy removal when desired. This lever is movable in a slot formed by alined recesses in plate 9 and the bottom of the seed-receptacle and is provided near its free end with a hole to receive a pin 23 and pivotally secure the same in the slotted end of a pitman 24, the other end of said pitman being mounted on the crank-arm of shaft 4, and hence transmit motion to oscillate said lever and the seed-plate, to which it is connected. When it is desired to disconnect the pitman from the lever, the free end of the pitman can be supported in a suitable bracket 25, secured to the side of the seed-receptacle for this purpose.

The operation of my improvements is as follows: Seed is placed in the receptacle on both sides of the partition, and one or more grains, according to the size of the seed and the openings 19, (separate plates being provided for planting various seeds,) will fall into said openings. As the wheel 3 is revolved by the forward movement of the machine it will, through the medium of pitman 24, oscillate the lever 20 and seed-plate 14, to which it is connected. This movement of the seed-plate serves to move the portions thereof containing the openings 19 beneath the cut-offs 17 and dropping the seed into ducts or passages 10, through which it passes into pipe 13 and is directed into the furrow, the cut-offs 17 serving to prevent the escape of any but the proper number of seed. The openings 19 are then carried beyond the cut-offs and again exposed to the seed, the reverse movement of the lever 20 returning the plate to its former position, during which movement the seed is dropped, as above explained.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a seeding-machine, the combination with a seed-receptacle having an opening in its bottom and a supporting-plate beneath said bottom and having a discharge-hole therein, of an oscillatory seed-plate disposed between the bottom of the receptacle and the supporting-plate and having an opening therein, a spring secured above the seed-plate, a cut-off secured to the free end of said spring and means for oscillating the seed-plate back and forth under said cut-off to control the discharge of seed through the supporting-plate.

2. In a seeding-machine, the combination with a seed-receptacle having an opening in its bottom and a supporting-plate beneath said bottom and having holes therein through which the seed is dropped, of a seed-plate disposed between the supporting-plate and seed-receptacle and having openings therein to receive the seed, a spring, cut-offs secured to the ends of said spring and engaging the seed-plate to prevent the escape of any but the contents of the openings in the seed-plate, and means for oscillating the seed-plate back and forth under said cut-offs.

3. In a seeding-machine, the combination with a supporting-plate having discharge-ducts at respective sides of its center, a receptacle mounted upon said supporting-plate and provided in its bottom with openings at respective sides of its center for the escape of seed, of a seed-plate located between said receptacle and supporting-plate and having holes therein to receive grain from the openings in the bottom of the receptacle, a spring secured between its ends, cut-offs secured to the respective ends of said spring and resting upon the seed-plate, and means for oscillating said seed-plate to move the holes therein back and forth under the respective cut-offs.

4. In a seeding-machine, the combination with a divided seed-receptacle having openings in its bottom and a supporting-plate to which the receptacle is hinged and made with openings at opposite sides of its center, of a coupling having ducts or passages therein communicating with said openings, a discharge hose or spout common to both ducts or passages, a seed-plate between the supporting-plate and receptacle and adapted to convey the seed to said ducts or passages, means for oscillating said plate and cut-offs carried by the receptacle to limit the amount of seed carried by the seed-plate.

5. In a seeding-machine, the combination with a seed-receptacle and a partition therein dividing the receptacle into two compartments, of a seed-plate having a hole under each compartment of the receptacle and adapted to drop the grain from both, spring-pressed cut-offs at respective sides of the partition and means for oscillating said seed-plate.

6. In a seeding-machine, the combination with a seed-receptacle having an opening in its bottom and divided by a central partition, of a circular seed-plate mounted to oscillate beneath the opening in the receptacle and adapted to convey the seed beneath the partition where it drops the seed, a spring secured beneath the partition, cut-offs carried by the ends of the spring and bearing on the seed-plate, and means for oscillating the seed-plate.

7. In a seeding-machine, the combination with a seed-receptacle, of a seed-plate mounted to oscillate beneath the receptacle and drop the seed, a lever having arms at one end to fit in grooves or recesses in the seed-plate, lugs on the arms to enter openings in the plate, and means for oscillating the plate.

In testimony whereof I have signed this specification in the presence of two subscribing witnesses.

WILLIAM LUTHER BOGLE.

Witnesses:
W. C. McCLURE,
H. P. SHERROD.